Feb. 15, 1938.   H. O. EIANE   2,108,599
GRASSHOPPER TRAP
Filed April 11, 1934   2 Sheets-Sheet 1

INVENTOR.
Halvor Olsen Eiane

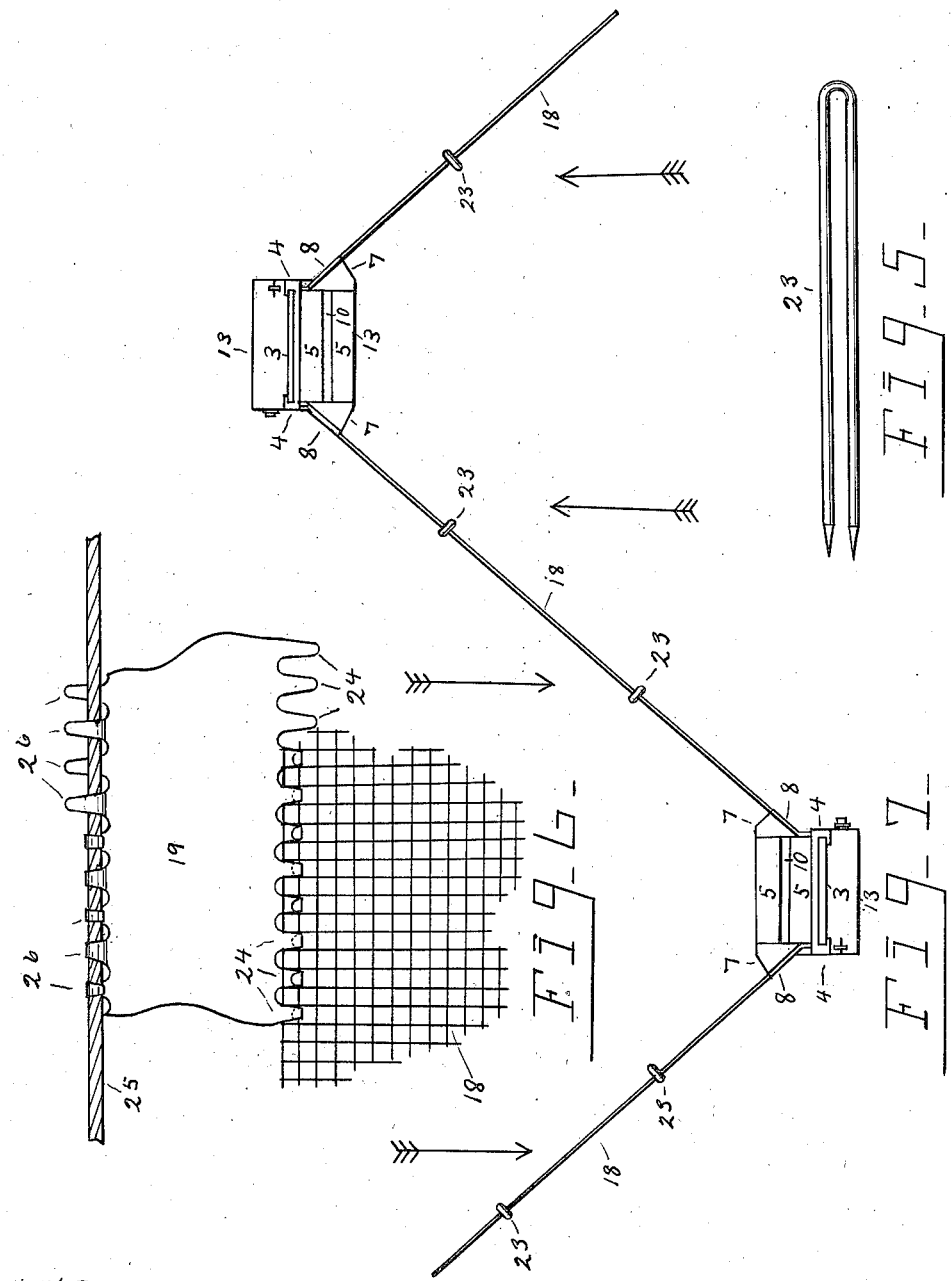

Patented Feb. 15, 1938

2,108,599

UNITED STATES PATENT OFFICE 2,108,599

GRASSHOPPER TRAP

Halvor Olsen Eiane, Washington Island, Wis.

Application April 11, 1934, Serial No. 720,032

6 Claims. (Cl. 43—107)

My invention relates to improvements in grasshopper traps, in which transparent baffle plates vertically disposed at the mouth of the traps in conjunction with diagonally disposed wire-screen leads play the chief role.

The objects of my invention are: first, to provide a grasshopper trap of great efficiency, capable at all times to catch most of the grasshoppers trying to pass through the trap lines; second, to substitute traps for the costly poison method as a means of keeping down the grasshopper menace; and, at the same time, save the useful insectivorous birds which die in large numbers from feeding on the poisoned grasshoppers.

I attain these objects by the use of a novel constructed grasshopper trap, hereinafter more fully described and claimed, having reference to the accompanying drawings, in which—

Figure 1 is a partly sectional front view of the trap taken on the line 1—1 of Fig. 2. Fig. 2 represents a sectional side view of the trap taken on the line 2—2 of Fig. 3. Fig. 3 is top view of the trap. Fig. 4 is a side view of a portion of the wire-screen leads showing in general outline the upper and lower sheet metal bindings.

Fig. 5 represents a staple-formed support for holding the wire-screen leads in an upright position.

Fig. 6 shows a detailed method of joining sheet metal strips to wire-screen leads and a flexible upper edge wire-rope.

Fig. 7 is a top view of a pair of grasshopper traps; of which there may be any number in a trap line, set in opposite facing direction with wire-screen lead connections running in a diagonal course.

Figure 1:
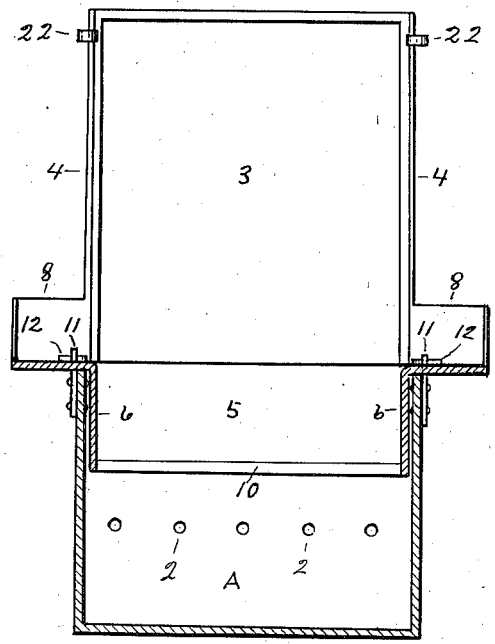
Figure 2:
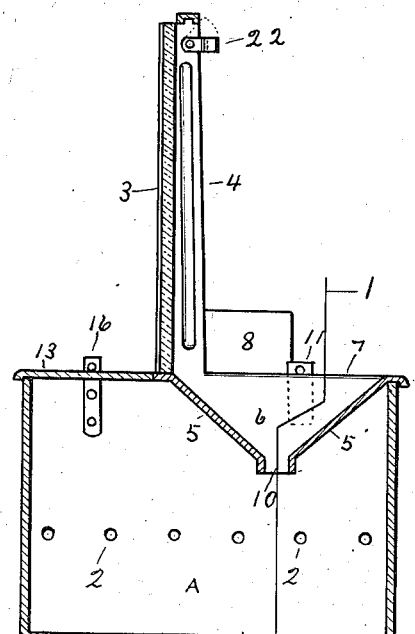
Figure 3:
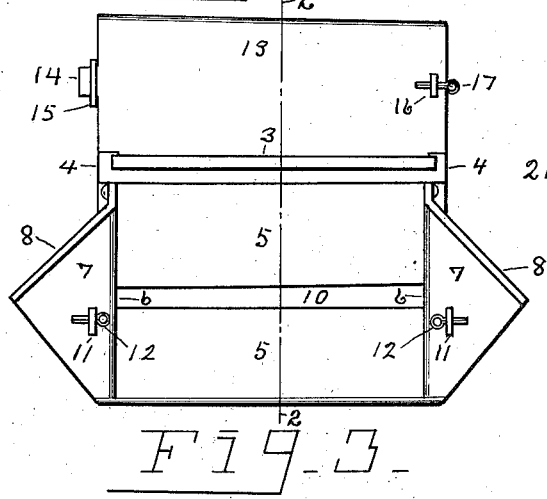

A, in Fig. 1, is the water-tight pit-box of the trap, which is provided with a number of holes 2, through which surplus rain water can flow out, thus, maintaining a constant water level at the point where the holes 2 are located.

The pit-box A, is made of metal or any other suitable material, and set in a pit dug in the ground, leaving the upper rim or edge of the box flush with the ground line.

The upper unit of the trap comprises the following parts: the transparent baffle plate 3, which preferably is made of clear glass; the framework 4 supporting the baffle plate 3; the two slanted mouth plates 5 together with their vertical end sections 6; the two horizontal platforms 7, and the two converging, vertically disposed guard plates 8.

The slot or throat opening 10 between the two mouth plates 5 provide an ever open entrance for its victims to the pit-box A.

The upper unit of the trap, with the exception of the baffle plate 3, is preferably constructed of galvanized sheet iron or zinc plate as the grasshoppers seem unable to gain a foothold on zinc coated surface set at 45 degrees or more from the horizontal.

The upper unit of the trap is removably secured to the pit-box A by the two ears 11, which are riveted to the outside wall of the pit-box A, passed through slots in the platforms 7 and crossed with cotter pins 12 at their upper ends.

A removable cover plate 13 over the rear part of the pit-box A is provided for the purpose of cleaning out imprisoned grasshoppers.

The cover plate 13 is held in a locked position by the projecting tongue 14, which passes through a slot in the ear 15. Ear 15 is riveted to the outside wall of the pit-box A, while, on the opposite side, ear 16 is riveted to the inside wall of the pit-box A, and is also passed through a slot in the cover plate 13 and crossed with a cotter pin 17 at its upper end.

Figure 4:
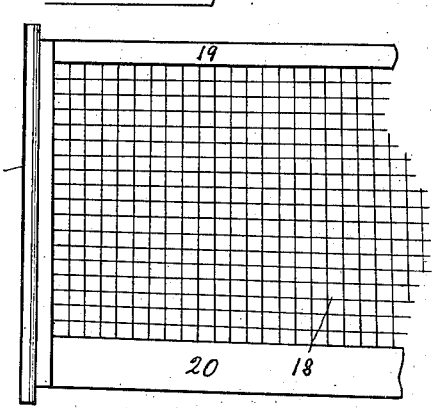

The wire-screen leads 18 (detailed section shown in Fig. 4) are bound with galvanized sheet metal strips 19 and 20.

The upper end of the terminal 21 is secured to the framework 4 by the swinging loop strap 22, while its lower end is secured to the bottom part of the framework 4 by stationary loop straps (not shown).

The wire-screen leads 18 are supported at suitable intervals by galvanized staple-formed supports 23 forced into the ground with a prong on each side of the wire-screen to keep it in an upright position.

Fig. 6 shows in detail how the teeth-shaped points 24 on the sheet metal lining 19 are put through meshes in the wire-screen 18 in alternate style and bent back upon themselves in hook-like formation—thus, the first tooth or point is put through a mesh from the left side of the wire-screen 18; the next tooth or point is put through from the right side, and so on along the whole wire-screen lead.

In a similar way, the wire-rope 25 is joined to the upper edge of the sheet metal lining 19 by the points 26, alternately bent around the wire-rope 25 in opposite directions, thus, insuring strength to it and the necessary flexibility required for rolling up and for transporting purposes.

The bottom sheet metal lining 20, being somewhat wider than the upper lining 19 allows the former to be partly dug into the ground, (or soil may also be thrown up against it) to prevent the grasshoppers from crawling underneath the leads.

As the grasshoppers on their move encounter the leads 18, they will try to climb over, but being unable to gain a foothold on the galvanized surface of the sheet metal lining 20, they will follow along until they reach the tapered ends of the platforms 7: at this point some of the grasshoppers will try to climb the vertical walls while others will jump against the transparent baffle plate 3, from which they fall down upon the slanted mouth plates 5 and slide down through the throat opening 10 into the partly water filled pit-box A where they drown after swimming around for a day or so.

Those grasshoppers which fly and alight in the meshes of the wire-screen 18 are prevented from climbing over by the upper sheet metal lining 19.

I do not intend to limit my invention to the exact description and drawings as herein given, as many changes can be made without departing from the principle involved.

Having thus described my invention, what I claim as new and desire to secure by Letters Patent is:

1. In a grasshopper trap, the combination of an underground pit-box having an open funnel-shaped mouth and throat overhead, a transparent baffle plate adjoining said mouth, and a pair of taper-ended horizontally disposed platforms on opposite sides of said mouth provided with outward upturned guard plates, and intervening vertical wall spaces between said platforms and said transparent baffle plate.

2. A grasshopper trap having an underground pit-box or receptacle, a plurality of overflow holes for maintaining a fixed water level therein, an open overhead mouth and slot-shaped throat opening communicating with said pit-box, a vertically disposed frame at the outer edge of said mouth, a transparent baffle plate mounted in said frame, a pair of converging wire-screen leads having upper and lower galvanized guard strip bindings connected at opposite sides to said frame and in conjunction with said transparent baffle plate forming an unbroken lead barrier wall to the mouth of said trap.

3. In a grasshopper trap having an underground pit-box, a plurality of overflow holes for maintaining a fixed water level therein, an open overhead mouth and slot-shaped throat opening communicating with the interior of said pit-box, a vertically disposed frame at the outer edge of said mouth, a transparent baffle plate mounted in said frame, a pair of converging wire-screen leads having upper and lower guard strip bindings connected to said frame and forming a continuous lead barrier wall in conjunction with said transparent baffle plate toward and around the mouth of said trap, and a pair of taper point ended platforms set in vertical walls at opposite sides of said mouth and inside the semi-inclosure of said lead barrier wall.

4. In a grasshopper trap having an underground pit-box, a plurality of overflow holes for maintaining a fixed water level therein, an open overhead funnel-shaped mouth and slot-shaped throat opening communicating with the interior of said pit-box, a vertically disposed frame at the outer edge of said mouth, a transparent baffle plate mounted in said frame, a pair of converging wire-screen leads having upper and lower guard strip bindings connected to said frame and forming a continuous lead barrier wall in conjunction with said transparent baffle plate toward and around the mouth of said trap, and a pair of platforms set in vertical walls at opposite sides of said mouth and having vertical drops along their inner edges to the tapered vanishing points fixed at a distance approximately two grasshopper lengths from said transparent baffle plate.

5. In a grasshopper trap the combinations comprising an underground pit-box, a plurality of overflow holes for maintaining a fixed water level therein, an overhead mouth and slotted throat opening communicating with the interior of said pit-box, a vertically disposed frame at the mouth of said trap, a transparent baffle plate mounted in said frame, a pair of taper point ended platforms set in vertical walls at opposite sides of said mouth, combined with a pair of converging wire-screen leads having upper and lower galvanized guard strip bindings which are provided with teeth hooked in alternate style to meshes on opposite sides of said wire-screen leads, all substantially as shown and described.

6. In a grasshopper trap comprising an underground pit-box, a plurality of overflow holes for maintaining a fixed water level therein, an open overhead mouth and slotted throat opening communicating with the interior of said pit-box, a vertically disposed frame at said mouth and a transparent baffle plate mounted therein, a pair of taper point ended platforms set in vertical walls at opposite sides of said mouth, and converging co-operating wire-screen leads having upper and lower guard strip bindings connected to said frame and forming a continuous lead barrier wall in conjunction with said transparent baffle plate and running in a zigzag formation with respect to a plurality of alternate opposite facing traps in a trap line, adapted to concentrate the run of grasshoppers from opposite directions upon and into the mouths of said traps, all substantially as shown and described.

HALVOR OLSEN EIANE.